April 10, 1951     F. J. CANTALUPO ET AL     2,548,516
VALVE FOR AUTOMATIC WASHING MACHINE
Filed Dec. 9, 1947     2 Sheets-Sheet 1
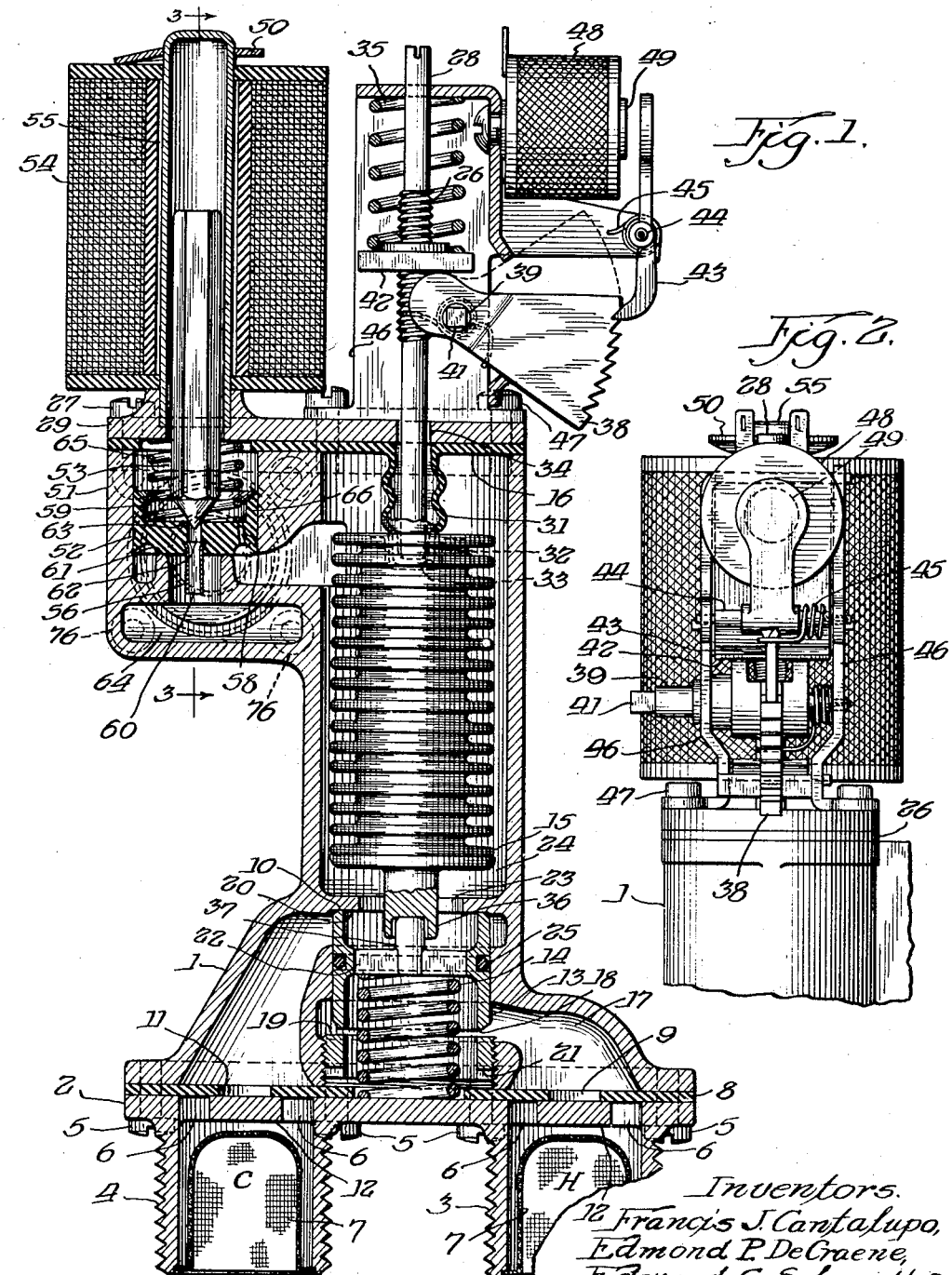
Inventors.
Francis J. Cantalupo,
Edmond P. DeGraene,
Edward G. Schmidt, &
Raymond P. Setka.
Chester W. Yant
By Joseph O. Lange
Atty.

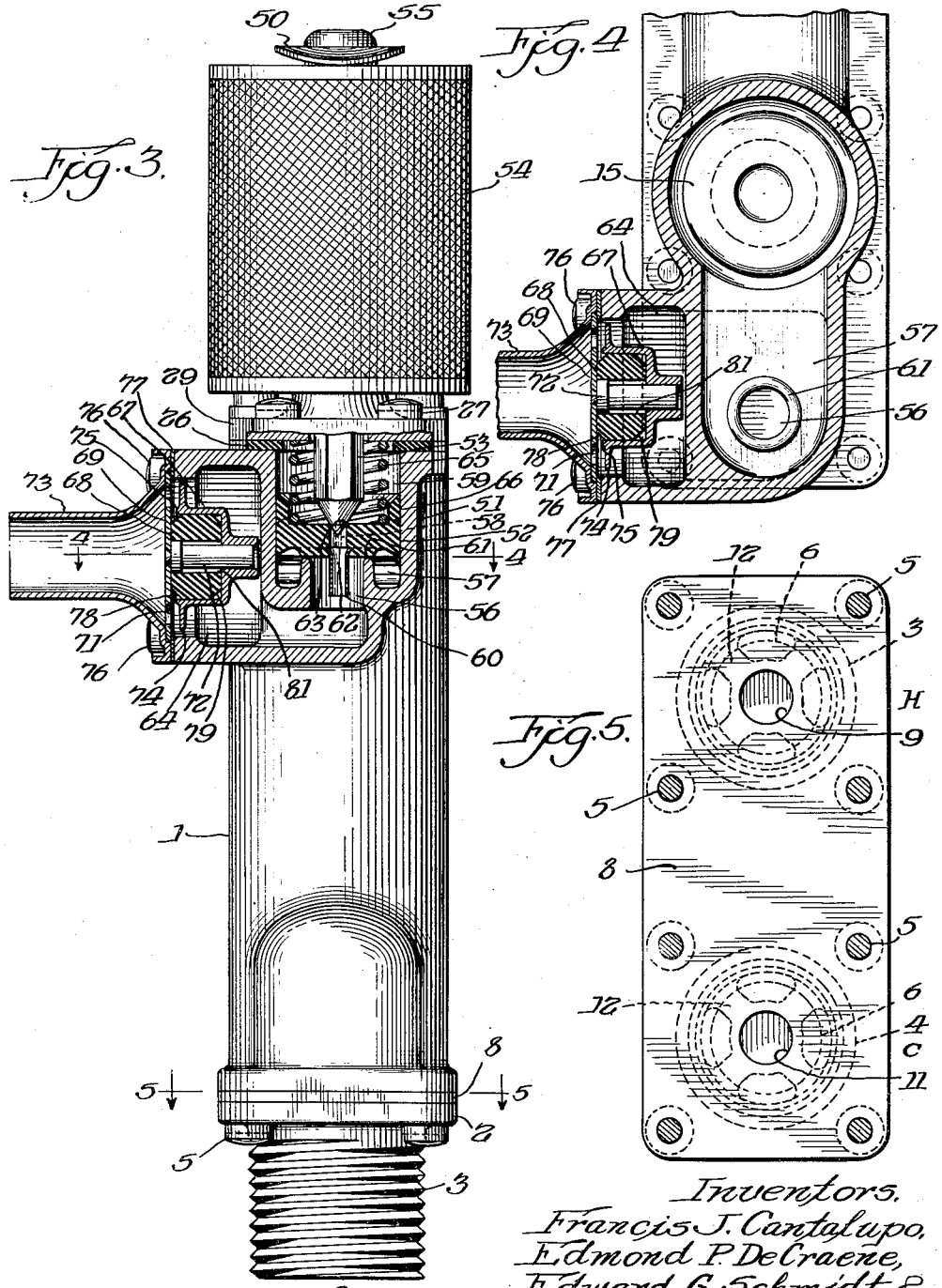

Patented Apr. 10, 1951

2,548,516

UNITED STATES PATENT OFFICE 2,548,516

VALVE FOR AUTOMATIC WASHING MACHINE

Francis J. Cantalupo, Chicago, Edmond P. De Craene, Westchester, Edward G. Schmidt, Western Springs, Raymond P. Setka, Chicago, and Chester W. Yant, Westchester, Ill., assignors to Crane Co., Chicago, Ill., a corporation of Illinois Application December 9, 1947, Serial No. 790,638

4 Claims. (Cl. 236—12)

This invention relates to valves and more particularly it is concerned with a valve suitable for use with automatic washing machines and the like. It will be apparent that while described in connection with the functioning of the currently popular automatic washing machines, it may of course be employed in other unrelated capacities on a wide variety of devices in which similar objectives are desired.

One of the more important objectives of this invention is to provide means cooperating with a timing device whereby flow of water into a washing machine may be permitted and then stopped in accordance with a cycle established by such timer.

Another object is to control the amount of water flow within set limits upon actuation of an electrical timing device irrespective of line pressure.

It is a further object to control the temperature of the water within close limits at any set temperature, but at the same time to permit the operator or user of the machine to exercise wide discretion in the selection of the desired temperature setting.

Another important object is to provide for a device which permits the automatic return of the temperature control mechanism from a high setting to a predetermined lower setting in accord with a time cycle controlled by the electrical timer or a suitable mechanical cam means.

Another object is to provide in a valve of this type means whereby cross-flow between hot and cold water inlet supply lines is prevented and also to prevent the entry or passage of line dirt, foreign matter or scale into the valve mechanism.

A still further object is to provide a more economically constructed valve than that which has heretofore been available.

It is conceded that valves presently on the market satisfy several of the objects hereinabove named, but to our knowledge no one previously has provided for the variable temperature control as hereinafter described in addition to the employment of automatic responsive means such as a single thermostatic element for automatically tripping the temperature control mechanism to a lower temperature setting.

It will further become apparent that an added advantage over similar valves heretofore available is the use of a temperature control mechanism providing for a wide range of temperature settings and also providing for the automatic setting to a lower temperature for rinsing when required during the course of the operating cycle of the washing machine upon which the valve of this invention is installed.

Other important objects and advantages will become more readily apparent upon proceeding with the following specification read in light of the accompanying drawings in which Fig. 1 is a sectional assembly view of a valve embodying our invention.

Fig. 2 is a fragmentary and exterior view of the valve looking toward the temperature control notched cam, pawl, electro-magnet and supporting parts.

Fig. 3 is a fragmentary sectional view taken on the line 3—3 of Fig. 1.

Fig. 4 is a fragmentary sectional view taken on the line 4—4 of Fig. 3.

Fig. 5 is a sectional view taken on the line 5—5 of Fig. 3.

Similar reference numerals refer to similar parts throughout the several figures.

Referring now to Fig. 1, the valve body or casing 1 is preferably provided with the lower extension 2 which serves as the connecting means to respective hot and cold water supply lines as indicated at H and C respectively, having such desired means for effecting a connection as the threads 3 and 4. Obviously other suitable connecting means may be substituted for the said threads. The extension portion 2 may be bolted as at 5 to the body 1, or may be made integral therewith.

As indicated, adjacent the connecting end of the extension 7 are the inlet ports designated 6, suitably located above the inlet screens 7, the arrangement of the inlet ports being more clearly apparent as shown in Fig. 5. Suitably interposed between the casing 1 and the extension inlet member 2 is the diaphragm inlet gasket 8, serving as check and sealing means, securely held in leak-proof relation therewith by means of the screws 5. As shown in Fig. 1, and perhaps more clearly in Fig. 5, the diaphragm gasket 8 is apertured at 9 and 11 only, thereby to suitably overlap the inlet ports 6 for reasons hereinafter explained, the web portion 12 being an integral part of the inlet portion 2. It will thus become immediately apparent that as water enters either or both of the inlets H and C it passes through the apertures 6 of the web 12 the pressure of the water causing the rubber-like diaphragm gasket 8 to flex upwardly thereby permitting the passage of the water across the face of the center section of the web 12 and through the passages 9 and 11 of the gasket 8. Therefore it is clear that the latter mentioned gasket not only seals the joint between the casing 1 and the inlet extension 2, but also functions as a check valve flapper or closure member. Thus if the pressure in the hot water inlet H should exceed that in the cold water inlet C the passage of the higher pressure water normally through the passages of the body 1 would establish a higher pressure on the outlet side of the cold water check valve then on the inlet side, which would tend to cause backflow through the cold water inlet. In so doing however the gasket 8 is forced into intimate or fluid seating contact with the web of the cold water inlet 6 of the extension 2 and prevents objectionable cross flow of the hot water into the cold water supply line, or vice versa, with pressure conditions reversed from those hereinabove described.

Within the casing 1, the mixing valve parts are contained and consist essentially of the said casing, the piston or regulating closure member 13, the piston spring 14, a thermostatic element such as the thermostatic bellows 15 and a sealing means such as the bellows type of rubber diaphragm 16 cooperating with the latter member. Assuming that the water from both hot and cold inlets has flowed through the diaphragm passages 9 and 11 into the chamber 17. The hot water passes between the lower edge 18 of the piston 13 and the top edge 19 of the adjusting ring 21. It then moves upwardly through webbed openings 22 in the piston 13, through the opening 23 into the bellows chamber 24 of the body 1. Similarly cold water entering through the gasket inlet 11 passes between the top edge 10 of the piston 13 and the oppositely disposed annular surface 20 of the body 1; such annular space, not shown, will exist due to the expansive action of the bellows under the initial influence of the hot water forcing the piston 13 downward sufficiently to create the said space. Thus the cold water will move upwardly into the passage 23 and thence into the bellows chamber 24, mixing with the hot water at the same time. As will hereinafter be explained, the mixed water passes around the bellows 15 and then out through the stop valve and flow control valve. It should be noted that leakage of hot water into the cold water around the periphery of the piston closure member 13 is prevented by employing an O-ring 25, which is made preferably of a rubber-like material, and eliminates the need for using close tolerances between the body bore and the outside diameter of the piston 13 and yet insures the accurate mixing of the water passing into the bellows chamber 24. Under certain conditions the O-ring may be dispensed with.

In actual assembly, the piston closure 13 and the O-ring 25 are placed into the position indicated and the adjusting ring 21 is then tightened in place until a predetermined gap between the surfaces 18 and 19 is provided between the piston and the ring. The spring 14 is then placed against the spidered portion of the piston adjacent the ports 22 and held in compression by the bolted extension 2, thus causing the piston 13 to return to its seat 20 after it has been longitudinally moved by expansion of the bellows 15, which is generally, but not necessarily, of the liquid filled type.

Sealing of the bellows chamber 24 at its upper portion is accomplished by means of the said gasket 16, held in place by the bolted cap 29 and the securing screws 27. For purpose of providing a leak-proof connection between the temperature control stem 28 and the cap 29 the gasket 16 is made with the corrugated expandible portion 31 snugly fitted over the lower end portion 32 of the stem 28 and received within the recess 33 of the bellows 15. The stem 28 projects through the aperture 34 of the cap 29 and is threaded at 26 for reasons hereinafter explained. It is desirable to provide means for absorbing the over run of the bellows 15, due to the relatively high temperatures of the mixed water and this is provided by allowing the spring 35 to be compressed if the bellows 15 should expand after the edge 18 of the piston 13 is seated against the adjusting ring 21 and upon the surface 19. At its lower end the bellows 15 is provided with the boss 36 recessed to be receivable upon and supported by the projecting portion 37 of the piston 13.

Adjusting means are provided for setting the valve and bellows for any desired temperature and to permit an automatic reset of the valve to a predetermined lower temperature, as for example such as that required for rinsing clothes in an automatic washing machine.

Directing attention in the latter connection to the upper portion of Fig. 1, the cam 38 is rotatable with the shaft 39, which latter member, as more clearly shown in Fig. 2, is arranged as at 41 for attachment to a knob or lever (not shown) on the front face or panel portion of a washing machine by such means (also not shown) as a flexible cable, a rigid shaft, gearing or other linkage or actuating means so that rotation or comparable movement of the shaft on the washing machine to a desired point indicated on a temperature scale showing suitable temperature ranges desirable for washing, will effect rotation of the cam shaft 39 and relative movement rotatively of the lever arm or cam 38. With this actuation in mind, it should be understood that rotation of the cam shaft 39 in a clockwise direction will cause the cam 38 to move the adjusting collar 42 and the rod 28 upwardly to provide a gap between the end 32 of the rod 28 and recessed surface portion 33 of the bellows 15. The pivotally mounted latch 43 on the shaft 44 is spring-loaded as at 45 to hold the arm or cam 38 in the desired position depending upon the desired movement of the bellows 15 and water temperature in demand. It will be apparent that the effect of providing a gap at the lowermost end of the rod 28 and the recessed surface 33 of the bellows 15 is to require a greater increase in the length of the bellows before any force is effected to move the piston 13. It should also be clear that the said increase in bellows length can only be obtained when and if the mixed water temperature rises with the ultimate result that such movement will provide increased temperatures of the mixed water. The amount of axial movement of the rod 28 necessary for any given temperature change in the setting is preferably calculated from the bellows characteristics and the piston 13. Threading of the rod 28 as at 26 allows for additional adjustability in connection with rod movement.

The above described assembly is supported on the bracket 46, bolted to the cap 29 as at 47, and rotation of the shaft 39 in a clockwise direction causes the compression of the spring 35, the latter member serving three purposes: (a) it provides sufficient resistance to forces created by the expansion of the bellows 15 to insure that the expansion in the said bellows is used to operate the piston member 13; (b) it absorbs the overrun of the bellows after the piston end portion 18 has seated against the adjusting ring 21 when the shoulder type of ring is employed and (c) it causes rotation of the shaft 39 and the cam 38 in a counter clockwise direction after the latch member 43 has been tripped to force the rod 28, the bellows 15 and the piston disc or closure 13 up to a position to shut off the flow of hot water and thus cause the mixed water temperature to drop to that desired for rinsing purposes, that is approximately 90° F. before the expansion and contraction of the bellows 15 is again used to control the mixed water temperatures within the desired range or tolerances. It should be understood of course that the latch 43 is tripped at the desired time in the general wash cycle of the automatic washer either by an electro-magnet 48 with a tripper contact 49 and connected operatively to an electrical timer (not shown) or else by means of a mechanical action provided by some common device (also not shown) connected into the automatic washing machine operating mechanism. The employment of the latter is not new and hence it is unnecessary to describe them in detail.

In connection with the operation of an automatic washing machine it is of course desirable to admit and to shut off the flow of water into the tub preferably in accordance with electrical impulses controlled by a suitable timer. This is conveniently accomplished in combination with the previously described mechanism by means of a solenoid valve in which the body portion 51 is preferably but not necessarily made integral with the casing 1. A piston-shaped cup-like disc 52 is employed having an armature 53 and a solenoid coil 54 with a pressure tight tube 55 to receive the armature 53. The solenoid coil is retained in place by the member 50. The water enters the solenoid stop valve chamber 56 when the valve is open by means of the channel 57 connected with the upper end of the bellows chamber 24, as more clearly shown in Figs. 1, 3 and 4. Thus line pressure is provided under the disc or closure member 52 and a hole 58 is provided near the disc periphery so that line pressure is permitted to pass into the chamber 59 above the disc. A seat 61 is provided in the valve proper preferably integral with the casing 51 and the central passage 56 handles the flow of water into the valve as discussed later. A central aperture 62 is provided in the disc 52, of larger diameter than the passage 58 so that when the armature 53 is lifted from its seat at 63, the water above the disc is discharged through the aperture 62 and into the outlet 64 at a faster rate than it is admitted through the opening 58. This construction results in a reduction of the load above the disc 52 in comparison with the load exerted by pressure on the lower surface and causes the piston-like disc 52 to rise permitting the flow of water into the outlet channel 64.

At this stage of the description, attention is called to the aspirator or eductor tube 60 mounted as indicated in Fig. 1, upon the member 52 so as to extend relatively deep within the seat opening 56, so that when the valve is fully open the lowermost portion of the tube does not extend above the seat 61. While the said tube is shown as a separate part, it may of course be made integral with the disc 52. It has been found that the tube member 60 aids in evacuating the contents of the chamber adjacent the armature into the valve chamber 56. It thus promotes full lift of the disc 52 which is a desirable feature in a valve of this type.

When it is desired to stop the passage of water through the valve, the solenoid 54 is de-energized when the timer breaks the electrical circuit to it. This construction permits the armature 53 to drop to its seat around the aperture 62 and thereby permits line pressure to increase above the disc 52 to build up sufficient force on top of the said disc to cause it to return to its seat. A spring 65 is provided between the cap or cover 29 and the disc 52 to aid in the latter described closing action. The shape of the disc 52 secures the advantage of an integral disc and piston member and when made of rubber-like material secures tight seating and also provides tight sealing around the piston periphery. The piston lips 66 act as a guide during the axial movement of the disc and also provides a yielding and tight seat for the armature 53.

In connection with controlling the rate of flow of the water as it passes from the stop valve and before discharging into the washing machine a flow control valve is provided. Primarily it consists of a cage 67, as shown more clearly in Figs. 3 and 4, in which latter member a rubber-like washer 68 is retained. In cooperation therewith an orifice plate 69 with a plurality of apertures 71 and an integral stem guide 72 is used, having connected in fluid tight relation the discharge pipe 73. It should be understood that the described assembly acts similar to a check valve in that the upstream pressure tries to force the cage 67 against the orifice plate 69 to stop the flow of water through the orifices 71, but the assembly differs from a check valve in that the washer 68 functions as a spring to prevent complete closure of said orifices. However the washer 68 does yield sufficiently to vary the gap between the flange 74 on the member 67 and the plate 69 inversely to the increase in pressure in the inlet between the cage and the stem 72 to insure proper guiding of the cage 21 and prevent any tendency toward erratic flow control due to tipping of the cage otherwise occurring. The shoulder at 75 on the cage 67 insures a minimum gap between the flange 74 and the orifices 71 of the plate 69. The discharge pipe 73 is bolted to the body portion 51 by means of the screws 76 and a leak-proof connection effective by the gasket 77. It has been found that the chamfered portions 78 and 79 aid in improving the performance of the rubber washer 68, and this also applies in allowing for the annular space 81 thereby permitting the proper deformation of the washer 68 to secure the desired control of outlet flow from the valve. It has been found too that a rubber or rubber-like material having a Shore hardness of 26 to 30 A gives the most satisfactory results.

It should be understood that all of the embodiment shown and described is adaptable for use on devices other than washing machine valves, and therefore we do not limit ourselves to the form of valve illustrated herein, because the invention as set forth in the following claims may be set forth in a plurality of forms and adaptations.

We claim:

1. In a valve of the character described, a casing, a regulating closure member therefor, temperature responsive means for regulating the movement of said regulating closure member, a rod limiting the expansion of the temperature responsive means to cause movement of the regulating closure member within a given temperature range, means including respectively a cam, a latch, and unlatching means for adjusting the position of the said rod in relation to said temperature responsive means, to provide for a range of predetermined mixed water temperature settings and to permit automatic repositioning of the said responsive means to a predetermined lower temperature setting, and resilient means cooperating with the said rod member to provide resistance to force created by said temperature responsive means to insure that expansion of the said latter element moves the said regulating closure member, said resilient means providing for absorption of excessive movement of the temperature responsive means; a second resilient means between said regulating closure member and the casing to insure movement of said regulating closure member upon contraction of said temperature responsive means.

2. In a valve of the character described, a casing, a regulating closure member therefor, temperature responsive means for regulating the movement of said regulating closure member, a rod limiting the expansion of the temperature responsive means to cause movement of the regulating closure member within a given temperature range, means including respectively a pivotally movable cam engageable by the said rod, a latch for the said cam, and unlatching means for adjusting the position of the said rod in relation to said temperature responsive means to provide for a range of predetermined mixed water temperature settings and to permit automatic repositioning of the said responsive means to a predetermined lower temperature setting, and resilient means for providing a predetermined resistance to the axial force created by said temperature responsive means to insure that expansion of the said latter element moves the said regulating closure member, said resilient means providing for absorption of excessive movement of the temperature responsive means, a second resilient means between said regulating closure member and the casing to insure movement of said regulating closure member upon contraction of said temperature responsive means.

3. In a valve of the character described, a casing, a regulating closure member therefor, temperature responsive means for regulating the movement of said regulating closure member, a rod bearing against an end portion of the temperature responsive means to limit the expansion of the said latter means to cause movement of the regulating closure member within a given temperature range, the rod having an annular projecting portion adjustably movable relative thereto, means including respectively a cam bearing against an annular surface of the rod projection, a pivotally mounted latch, and unlatching means comprising an extension of the said latch for adjusting the endwise position of the said rod in relation to the said temperature responsive means to provide for a range of predetermined mixed water temperature settings and to permit automatic repositioning of the said responsive means to a predetermined lower temperature setting, and resilient means supported by the projecting portion of the said rod member to provide end resistance to the axial force created by said temperature responsive means to insure that expansion of the said latter element moves the said regulating closure member, said resilient means providing for absorption of excessive movement of the temperature responsive means, a second resilient means cooperating with the said regulating closure member to effect movement of said regulating closure member upon contraction of said temperature responsive means.

4. In a valve of the character described, a casing, a reciprocably movable piston-type regulating closure member therefor carrying relatively loosely disposed sealing means in slidable relation to the casing, temperature responsive means for regulating the movement of said closure member, an adjustably mounted rod limiting the expansion of the temperature responsive means to define movement of the regulating closure member within a given temperature range, means including respectively a pivotally movable cam, a latch engaging an edge of the cam, and independently actuated unlatching means for adjusting the position of the said rod axially in relation to said temperature responsive means to provide for a range of predetermined mixed water temperature settings and to permit automatic repositioning of the said responsive means to a predetermined lower temperature setting, and a plurality of resilient means respectively cooperating with spaced-apart portions relative to the said rod member to provide resistance to the endwise force created by said temperature responsive means to insure that expansion of the said latter element moves the said regulating closure member, a portion of said resilient means providing for absorption of excessive movement of the temperature responsive means and means cooperating with said regulating closure member and the casing to insure movement of said regulating closure member upon contraction of said temperature responsive means.

FRANCIS J. CANTALUPO.
EDMOND P. DE CRAENE.
EDWARD G. SCHMIDT.
RAYMOND P. SETKA.
CHESTER W. YANT.

REFERENCES CITED

The following references are of record in the file of this patent:

UNITED STATES PATENTS

| Number | Name | Date |
|---|---|---|
| 1,707,541 | Roth | Apr. 2, 1929 |
| 2,161,769 | Trask | June 6, 1939 |
| 2,236,477 | Fuchs | Mar. 25, 1941 |
| 2,251,441 | Dillman | Aug. 5, 1941 |
| 2,381,146 | Von Wangenheim | Aug. 7, 1945 |
| 2,389,134 | Brown | Nov. 20, 1945 |
| 2,442,886 | Bowen | June 8, 1948 |
| 2,444,631 | Chace | July 6, 1948 |
| 2,444,677 | Rosenblum | July 6, 1948 |
| 2,448,170 | Brown | Aug. 31, 1948 |